United States Patent
Douglas et al.

(10) Patent No.: US 6,363,424 B1
(45) Date of Patent: Mar. 26, 2002

(54) REUSE OF SERVICES BETWEEN DIFFERENT DOMAINS USING STATE MACHINE MAPPING TECHNIQUES

(75) Inventors: Janet Beeler Douglas, Naperville; Warren Alan Montgomery, DeKalb; Kumar Venkata Vemuri, Naperville; Tsun-Chieh Chiang, Naperville, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/388,393

(22) Filed: Sep. 1, 1999

(51) Int. Cl.[7] .............................................. G06F 13/00
(52) U.S. Cl. ...................................... 709/224; 709/227
(58) Field of Search ................................ 709/224, 227; 703/21; 379/91.01, 207; 370/355, 466; 395/500.42; 455/510

(56) References Cited

U.S. PATENT DOCUMENTS

| | | | | |
|---|---|---|---|---|
| 5,539,884 A | * | 7/1996 | Robrock, II | 709/227 |
| 5,621,670 A | * | 4/1997 | Maeda et al. | 395/500.42 |
| 5,655,007 A | * | 8/1997 | McAllister | 379/91.01 |
| 5,970,416 A | * | 10/1999 | Ablay et al. | 455/510 |
| 6,111,893 A | * | 8/2000 | Volftsun et al. | 370/466 |
| 6,118,780 A | * | 9/2000 | Dunn et al. | 370/355 |
| 6,122,357 A | * | 9/2000 | Farris et al. | 379/207 |
| 6,185,519 B1 | * | 2/2001 | Lin et al. | 703/21 |

* cited by examiner

*Primary Examiner*—David Wiley
(74) *Attorney, Agent, or Firm*—Thomas E. Hill; Emrich & Dithmar

(57) ABSTRACT

In an Internet protocol (IP)-based multimedia system having a voice over packet infrastructure call handling involves the execution of a call processing program that controls state transitions in a finite state machine termed the "call model." These transitions are representative of the events that occur during the lifetime of the call and result in the execution of pre-defined actions. In order to provide high level Intelligent Network (IN) capabilities to IP end-point subscribers, a call model layer implements the IN call model, but is closely integrated with the IP-based, multimedia call model that runs within the base platform. The integration employs a precisely defined state-level map between states in the IN call model and the corresponding states in the base call model. The IN call model layer is thus able to support access to IN components to permit the existing base of IN services to be easily accessed and to permit the base layer to support client-level interaction and event handling. A call state information is shared between the two layers to enable them to operate in synchrony. State transitions made by one call model finite state machine (FSM) are thus reflected in the other. Services within the IP space may still be accessed by the base call model layer, allowing for access to both IP-based and IN-based services. The IN call model layer can be reused across various base platforms with little, if any, modification making it essentially portable.

10 Claims, 11 Drawing Sheets

REUSE OF SERVICES BETWEEN DIFFERENT DOMAINS USING STATE MACHINE MAPPING TECHNIQUES

TECHNICAL FIELD

This invention relates generally to call model integration in a voice over communications network and is particularly directed to providing access to features external to a given domain by overlaying a call model representation intrinsic to an external domain atop a base call model integral to a pre-specified base domain.

BACKGROUND OF THE INVENTION

The Internet as a means of voice communication (VoIP) is gaining widespread acceptance at a rapid rate. At the same time, Intelligent Network (IN) services are increasingly being used to enhance the user experience within the context of Public Switched Telephone Network (PSTN) calls. Obvious advantages would be derived by employing the technology and services from the PSTN domain as VoIP-based applications become more widespread, while maintaining access to various network types, i.e., write a service once and use it in different types of networks transparently.

Call handling in any communications system requires the execution of a call processing program that handles state transitions in a finite state machine called the "call model." These transitions are representative of the events that occurred during the lifetime of the call, and result in the execution of various pre-defined "actions." A call model typically is executed by switches within the network. At certain points within the execution of a call model, some of these actions may result in the firing off of queries to other network components such as Intelligent Network (IN) service control points (SCPs) for more information on how call events are to be treated or how call processing is to be handled, going forward. This scenario brings to the fore two basic requirements for easy access to existing IN services:

a. The call model executing on the switch must be capable of supporting a finite state machine (FSM) that models the states expected of an IN call model, and
 b. The entity attempting to query the SCP for access to IN services must use messages specified in some pre-defined, agreed-upon format.

Traditional public switched telephone network (PSTN) switches endowed with IN capabilities (SSPs) satisfy both the above requirements and are capable of performing the following functions:

a. Call processing functions involving signaling to/from end-points, signaling between switches in the path from the originating to the terminating end-point, etc., and
 b. Access to IN services hosted off of network components such as the SCP.

Internet protocol (IP)-based switch implementations (the so-called softswitches), however, support an IP-based multimedia call model whose state machine is typically based on protocols such as H.323 and SIP where the states are not IN-compliant. Therefore, there is a need to provide IN service access and reuse for IP end-point subscribers.

SUMMARY OF THE INVENTION

The present invention is directed to a novel approach for providing the existing set of traditional public switched telephone network (PSTN)-based Intelligent Network (IN) services to Internet protocol (IP) end-point subscribers. The present invention employs a call model layer that implements the IN call model, but is closely integrated with the IP-based, multimedia call model that runs within the base platform. This integration is achieved through a state-level map between states and the IN call model and the corresponding states in the base call model. The IN call model layer is thus capable of supporting access to IN components so that the existing base of IN services may be easily accessed and the base layer is capable of supporting client-level interaction and event handling. Call state information is shared between the two layers to enable them to operate in synchrony. State transitions made by one call model finite state machine (FSM) are thus reflected in the other.

More specifically, in a traditional IN-capable public switched telephone network (PSTN) a switch or service switching point (SSP) is capable of performing call processing functions involving signaling to/from end-points, signaling between switches in the path from the originating to the terminating end-point, and various other functions. In addition, access to IN services hosted off of network components such as the service control point (SCF) are also provided. While the present invention is disclosed primarily in terms of providing IN services to IP end-point subscribers, this invention is not limited to interfacing these two types of protocols. This invention thus also contemplates interfacing other base protocols such as Session Initiation Protocol (SIP) with other service protocols such as Transaction Capabilities Application Part (TCAP) or Intelligent Network Application Part (INAP), and variations thereof.

In IP-based implementations, the Soft SSP includes a gatekeeper which performs functions such as admission control, bandwidth control, location services, call setup signaling, call processing, etc., for end-points within its zone, when "gatekeeper routed" calls are set up. In order to do this, the gatekeeper supports a call model within a finite state machine (FSM) in the SSP that it executes for each call. In order to support access to IN services from IP end-points, the present invention emulates/integrates these functions within/into an IP element. The emulation/integration is accomplished by precise mapping of semantically equivalent states in the IN call model and the corresponding states in the IP-based call model.

By integrating the IN call model layer and the IP-based call model layer, services within the IP domain may also be accessed by the call model layer. Thus, access is provided to both IP-based and IN-based services without constraining the implementation in any way. In addition, integrating the functions for providing access to IN services from IP end-points into an IP element provides a "portable" IN call model layer which may be reused across various base platforms with little, if any, modification. This affords wider reuse and greater flexibility for the present invention and an easy evolution path for future developments.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
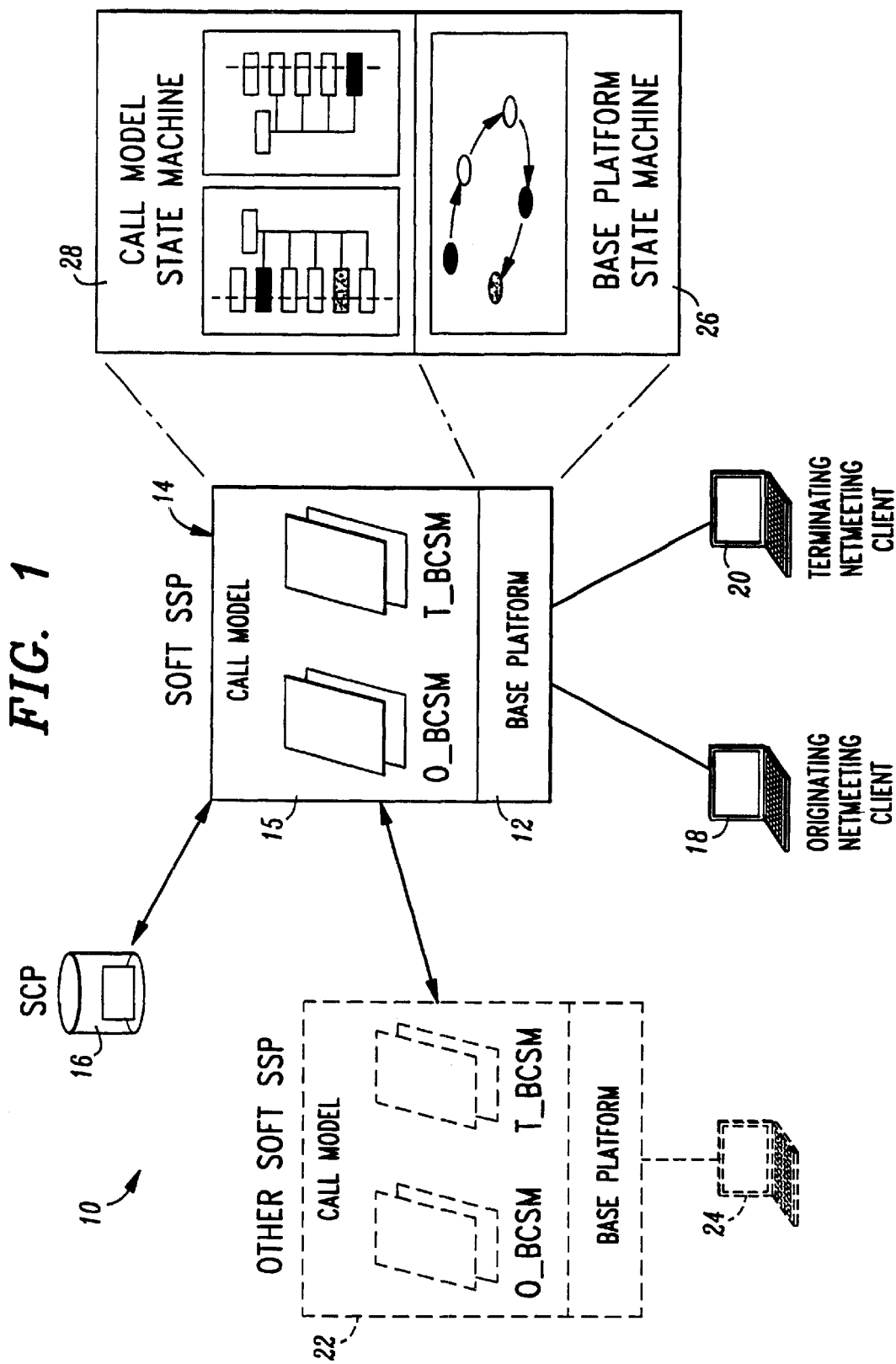
FIG. 1 is a simplified block diagram of an Internet telephony system for providing intelligent network services incorporating call model integration in an Internet protocol element in accordance with the principles of the present invention.

Referring to FIG. 1, there is shown in simplified block diagram form an Internet protocol (IP)-based multimedia system 10 having a voice over packet infrastructure call handling capability in accordance with the present invention. The system includes a soft service switching point (SSP) 14 which includes a call model 15 and a base platform 12. As shown in the right-hand portion of FIG. 1, the SSP call model includes a call model finite state machine 28. The call model state machine 28 governs/controls the execution of a call, the manner in which a call progresses, the features/ services accessed during the call, and at what call states. Similarly, the base platform includes a base platform state machine 26 which serves as a mediator between end-points, such as a call originating subscriber 18 and a call terminating subscriber 20. The base platform state machine 26 is sometimes referred to as a "gatekeeper." Other IP network elements that support an IP-based call model in some form such as softswitches call agents, etc., may also be used with the present invention. The call model state machine 28 includes an Originating Basic Call State Model (O_BCSM) and a Terminating Basic Call State Model (T_BCSM). The SSP 14 may be with one or more other soft SSPs 22, each having one or more associated end-point subscribers 24. The SSPs 15,22 form what is sometimes referred to as a base domain or network which provides various services. SSP 14 is further in communication with a Service Control Point (SCP) which forms, or is part of, a service or external domain such as an Intelligent Network (IN).

Figure 2:
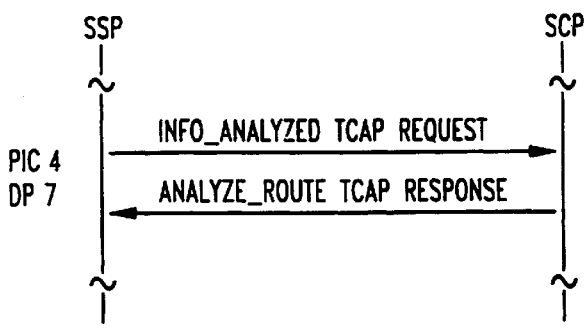
FIG. 2 is a simplified example call flow diagram depicting access to IN services in telephony system.

In general terms, a traditional Intelligent Network (IN)-capable Public Switched Telephone Network (PSTN) switch or Service Switching Point (SSP) is capable of the following functions:

a. call processing functions involving signaling to/from end-points, signaling between switches in the path from the originating to the terminating end-point, etc., and b. access to IN services hosted off of network components such as the SCP. FIG. 2 is a simplified flowchart illustrating access to IN services (here LNP or Local Number Portability) in a telephony system.

Functions (a) and (b) above are embodiments of the Call Control Function (CCF) and the Service Switching Function (SSF) from the distributed functional plane of the layered IN architecture.

ISDN User Part (ISUP) is used for inter-switch signaling (NNI or Network-to-Network interfaces), while Q.931/ Q.932 signaling is used between end-points and switches in function (a) above. For communication between switches and IN elements such as the Service Control Point (SCP) in function (b) above, Transaction Capabilities Application Part (TCAP) or Intelligent Network Application Part (INAP) is used. In traditional networks, all signaling is carried over SS7 links. (Several other inter-switch signaling methods exist, these are just indicative of the kinds of protocols used).

While traditionally SCPs could receive requests only over SS7 signaling links, of late SCPs are evolving to support TCP/IP interfaces as well, Therefore, TCAP signaling between SSPs and SCPs may be transmitted using either TCAP/SS7 (with appropriate transport level conversions being performed on a signaling gateway as required), or TCAP/IP, if the SSP functions are hosted on an IN element with IP interfaces.

In the H.323 domain, the gatekeeper performs functions such as admission control, bandwidth control, location services, call setup signaling, call processing etc., for end-points within its zone, when "gatekeeper routed" calls are set up. In order to do this, the gatekeeper inherently supports a call model that is embodied within a Finite State Machine (FSM) that it executes for each call. H.323 is evolving to support inter-gatekeeper signaling through messages described in H.323 Annex G.

The CCF and SSF are tightly coupled in switches. In order to support access to IN services from IP end-points, the present invention emulates/integrates these functions within/ into an IP element. This emulation/integration is accomplished in the gatekeeper in the present invention.

An SSP implements a call model, which consists of several Points in Call (PICs) each of which represents a particular state in the Intelligent Network (IN) FSM. Call processing involves the transition from one state to another in this FSM based on certain conditions that occur or events that are received, within the context of that call.

IN service access is permitted at various PICs at pre-defined points called Detection Points (DPs), each of which can support one or more triggers. A trigger is specified with criteria that cause it to fire. If a trigger is armed (turned on), and its firing criteria are satisfied, a TCAP or INAP query is formatted by the SSP and routed to the SCP for processing. (INAP is used in Europe where such queries are supported by a protocol layer called TC for Transaction Capabilities. A TCAP-encapsulated IN implementation preceding INAP is used in US implementations). The SSP may choose to halt call processing until a response is received from the SCP. (Other treatments may also be available, but are not part of the present invention and are thus not discussed herein. The SSP processes the responses received, and continues with call processing in accordance with these instructions.

Triggers are of many types, may be armed using different mechanisms (from the SCP or from the SMS—the Service Management System), and may operate differently.

The FSM associated with the originating end is termed the Originating Basic Call State Model (O_BCSM), while that which corresponds to the destination end is called the Terminating Basic Call State Model (T_BCSM). If both end-points involved in a call are connected to the same switch, then the switch executes both the O_BCSM and the T_BCSM as part of call processing. If the originating and terminating end-points are connected to different switches, then each of these two switches, and every switch in the path connecting these two switches execute both state machines. These state machines remain synchronized through the propagation of ISUP messages. IN features may be accessed from any switch along the path.

IN call models typically conform to capability sets (CS) that define what kinds of services may be supported. As of this writing CS-1, CS-2, and CS-3 are defined.

Figure 3A:
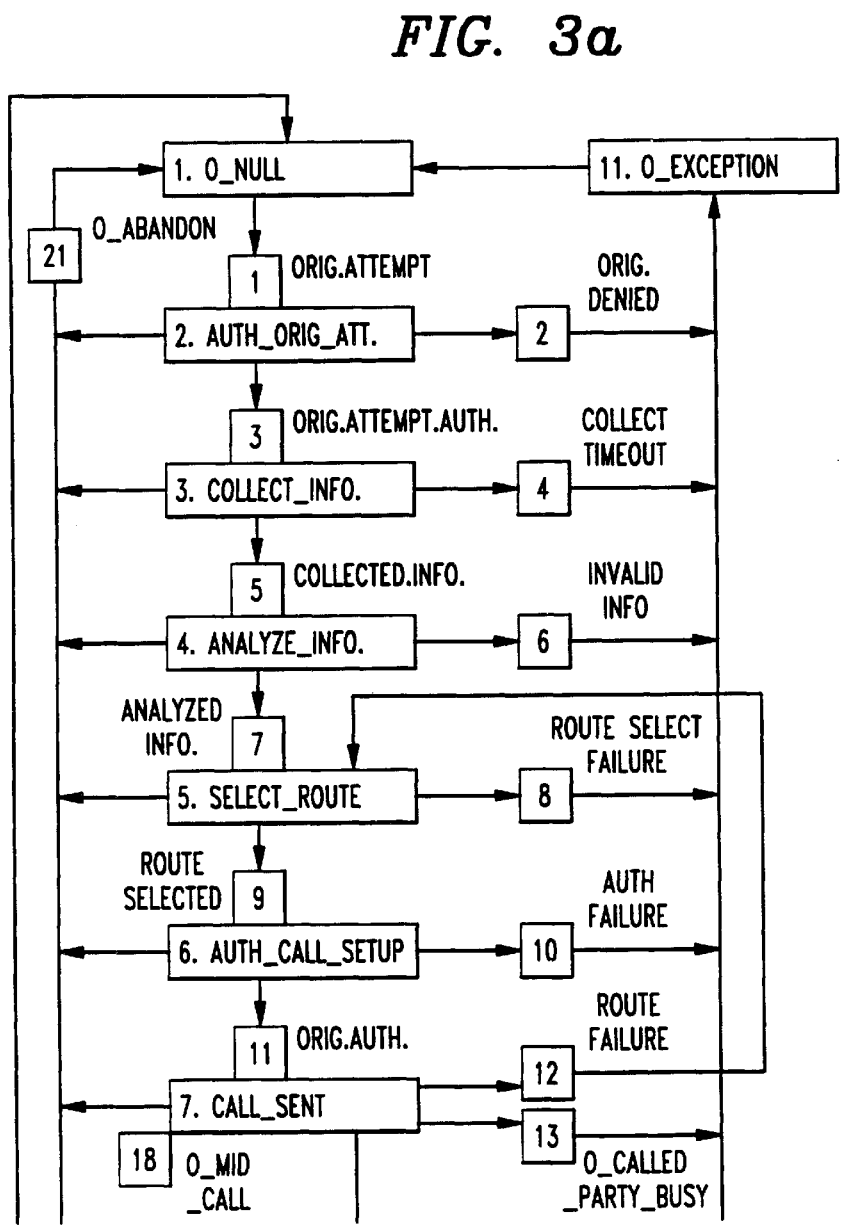
FIGS. 3a and 3b depict the Originating Basic Call State Model (O_BSCM) in the generic (CS-independent) IN call model.
Figure 3B:
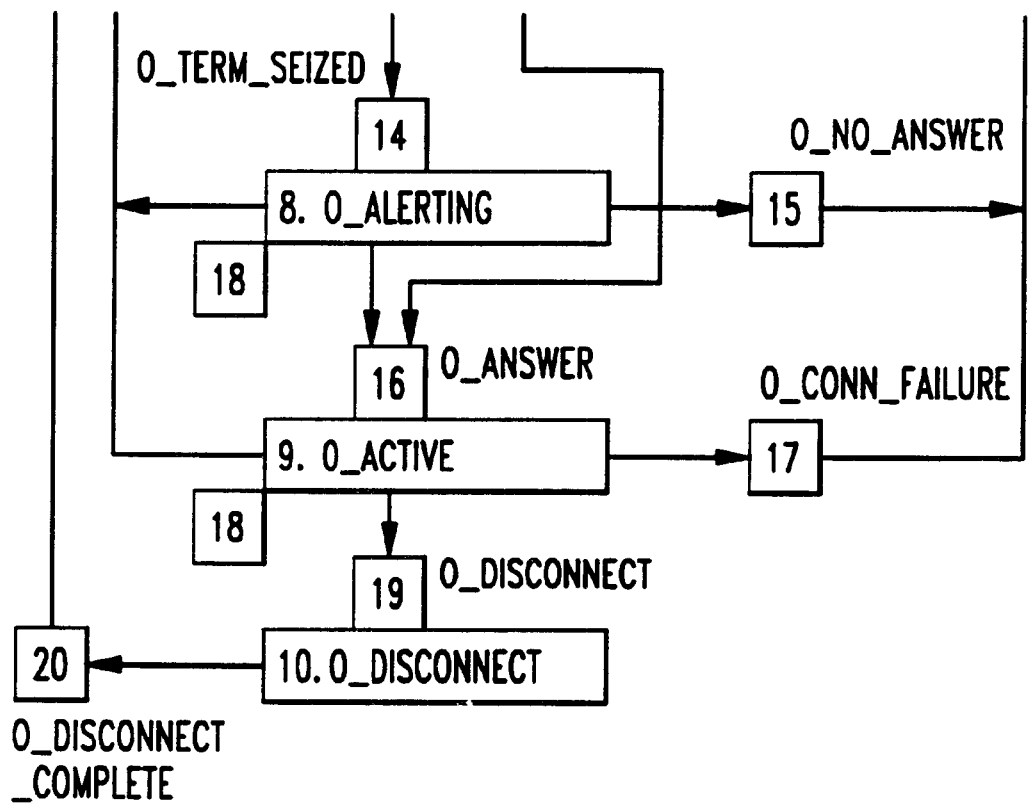
Figure 4:
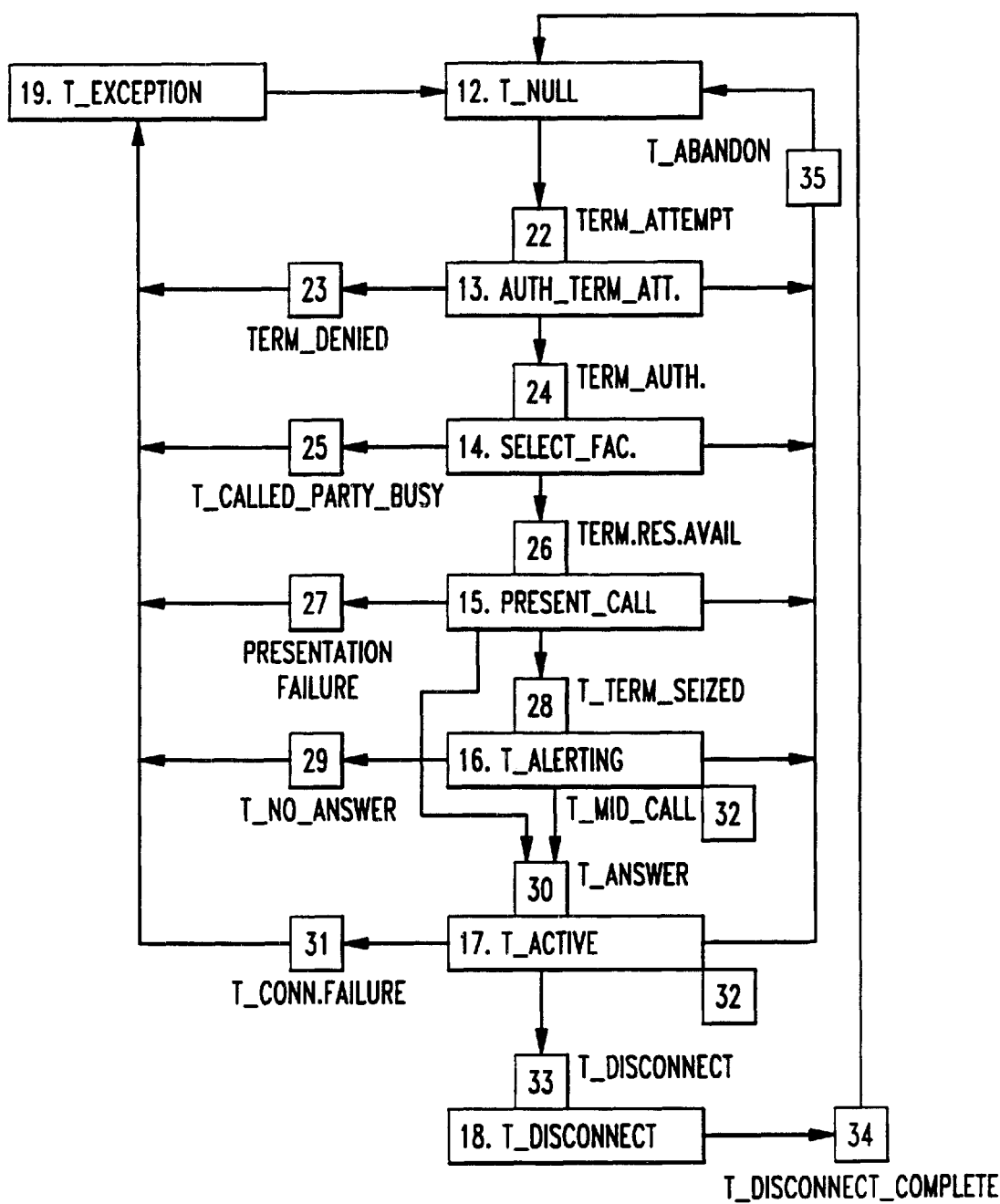
FIG. 4 depicts the Terminating Basic Call State Model (T_BCSM) in the generic (CS-independent) IN call model.

FIGS. 3a and 3b depict the O_BCSM while FIG. 4 depicts the T_BCSM in the generic (CS-independent) IN call model. PICs, DPs and transitions are clearly indicated. Auth_Orig._Att. is an example of a PIC. O_Abandon is an example of a DP, while the directed line segments in the figure denote state/PIC transitions. For a comprehensive description of the functionality associated with each PIC in the call model, please see pages 99 through 106 in *The Intelligent Network Standards: Their Application to Services* (McGraw Hill Series on Telecommunications) by Igor Faynberg (Editor), Marc P. Kaplan, Nitin Shah, Lawrence Gabuzda, November 1996. Table 1 provides a basic description of each state within the IN call model. In PIC 4, DP 7, an SSP may need to make an LNP (Local Number Portability) query of the SCP. It then formats and sends a TCAP Info_Analyzed message to the SCP, which then responds with a suitably formatted Analyze_Route TCAP response. The SSP can then decode the response and use the information within it as appropriate as it continues with call processing.

TABLE 1

IN Call Model PICs and their functions.

| IN PIC Name | Basic Function |
| --- | --- |
| O_Null | Call does not exist yet. |
| T_Null | |
| Auth_Orig_Att | CCF detected that someone wants to make a call. A determination is made whether a call can be made at that time, on that line. |
| Collect_Info | Dialing string is collected from the calling party. |
| Analyze_Info | Dialed string is translated to a routing address. Type of call (local/toll/international) is identified. |
| Select_Route | Using the routing address, a physical route is selected. |
| Auth_Call_Setup | The call is authorized with the dialed string. |
| Call_Sent | Control transferred to T_BCSM. O_BCSM waits for indication that call has been presented, or that a presentation is not possible. |

TABLE 1-continued

IN Call Model PICs and their functions.

| IN PIC Name | Basic Function |
| --- | --- |
| O_Alerting | O_BCSM waiting for the called party to answer. |
| T_Alerting | Called Party is being alerted. |
| Present_Call | Call is being presented to the called party. Phone just starts ringing. |
| Auth_Term_Att | Verification done to ensure that this call can be passed to the called party. |
| Select_Facility | Terminating Resource (line or trunk) is selected. |
| O_Active | Call is in active state |
| T_Active | (parties involved are talking). |
| O_Disconnect | Call has been disconnected. |
| T_Disconnect | |
| O_Exception | Error or exception condition |
| T_Exception | occurred during processing. |

H.323 supports a family of signaling protocols, each of which serves a different purpose (RAS-Registration, Admission and Status; signaling functions; call signaling functions; H.245 control channel signaling; among others). RAS signaling is used only in environments that support a gatekeeper, and is used for signaling between end-points and the gatekeeper for registration, admission, bandwidth changes and disengage procedures. RAS signaling is done before other call-related signaling. Since this signaling is not directly related to call signaling, this subject is not covered further in the present application.

The H.323 protocol uses the H.225/Q.931 message set and call state machine for call setup and control to establish a connection between two H.323 end-points. In networks containing a gatekeeper, a Call Signaling Channel is opened between the end-points and the gatekeeper or between the end-points themselves, if permitted by the gatekeeper. Here, we focus on the "Gatekeeper Routed Call Signaling" model, where call related signaling is routed through the gatekeeper on its path from one end-point to another.

Figure 5:
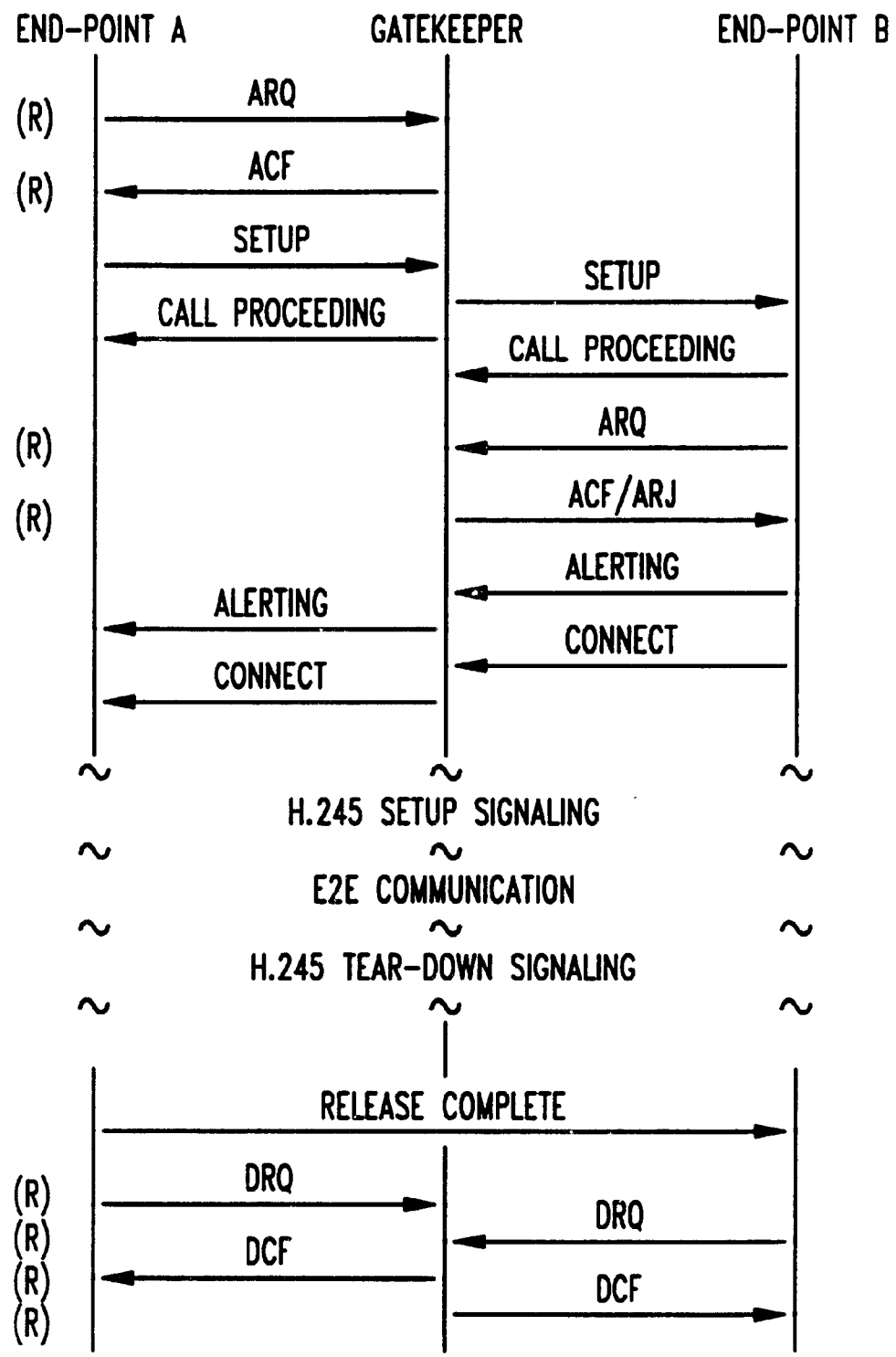
FIG. 5 is a simplified diagram of a typical call setup and tear-down.

Call signaling associated with the Q.931 protocol is of particular importance to the present invention. Q.931 defines several procedures associated with call-related signaling. For simplicity, we shall consider only simple call setup and tear-down. The Q.931 call model states and state-transitions are as depicted below. The FSM for call setup shown in FIG. 5 depicts the process from a gatekeeper perspective. In FIG. 5, S indicates that a message is sent out and R indicates that a message is received. The party to which the message is sent, or from which the message is received, is specified in parenthesis. Analogous FSMs also execute within the context of each end-point connected to the call.

The Q.931 message-set includes the following messages:

ALERTING: sent by the terminating end-point to the gatekeeper and by the gatekeeper to the originating end-point to indicate that the terminating end-point is being alerted.

CALL PROCEEDING: sent by the terminating end-point to the gatekeeper and by the gatekeeper to the originating end-point to indicate that call establishment has been initiated.

CONNECT: sent by the terminating end-point to the gatekeeper and by the gatekeeper to the originating end-point to indicate that the terminating end-point has accepted the call.

CONNECT ACKNOWLEDGE: sent by the gatekeeper to the terminating end-point to indicate that the call has been granted.

DISCONNECT: sent by an end-point to request the gatekeeper to drop the call or the gatekeeper to an end-point to indicate that the call will be dropped.

INFORMATION: sent by an end-point or the Gatekeeper to provide additional information needed for call establishment or other call related information.

RELEASE: sent by an end-point or the gatekeeper to indicate that it has or intends to disconnect.

RELEASE COMPLETE: sent by an end-point or the gatekeeper to indicate it has disconnected.

SETUP: sent by originating end-point to the gatekeeper and by the gatekeeper to the terminating end-point to request call establishment.

SETUP ACKNOWLEDGE: sent by the gatekeeper to the originating end-point or by the terminating end-point to the gatekeeper, to indicate that call establishment hag been initiated, when there is not enough information available to route calls.

STATUS: sent by an end-point or the gatekeeper to respond to a STATUS ENQUIRY message or to report certain error conditions.

STATUS ENQUIRY: sent by an end-point or the gatekeeper to request call status from another end-point.

USER INFORMATION: sent by an end-point to the gatekeeper or the gatekeeper to an end-point to transmit information about one end-point to another.

H.245 signaling is used for capabilities exchange, the opening and closing of logical channels, mode preference requests etc., between end-points connected within the context of a call. This signaling is done after some basic H.225.0 messages have already been exchanged as part of call setup.

Figure 6:
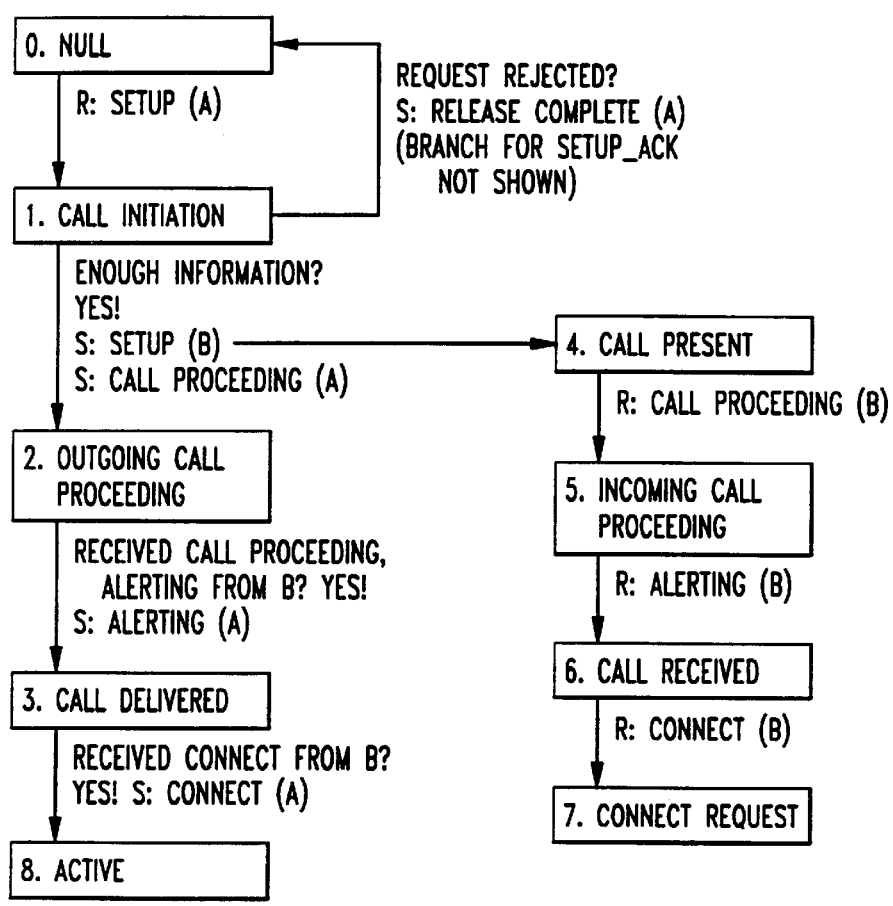
FIG. 6 is a simplified flowchart illustrating the Q.931 call setup procedures adapted from the Q.931 protocol specification as used in the present invention.

In the scenario illustrated in FIG. 6, both end-points are registered to the same gatekeeper and the gatekeeper routed call signaling model is used. End-point A sends the SETUP message to the gatekeeper requesting that a call be initiated. The gatekeeper checks to verify if there is enough information in the SETUP message to route the call, and if there is, sends a CALL PROCEEDING message to End-point A while simultaneously forwarding the SETUP message to End-point B. If End-point B chooses to accept the call, it may respond with a CALL PROCEEDING message and then an ALERTING message (while ringing the destination terminal) to the gatekeeper. The gatekeeper forwards the ALERTING message to End-point A. Upon user acceptance of the call at the destination end, End-point B sends a CONNECT message with an H.245 Control Channel Transport Address for use in H.245 signaling, to the gatekeeper. The gatekeeper sends the CONNECT message to End-point A containing the H.245 Control Channel Transport Address for use in H.245 signaling.

It should be noted here that in gatekeeper routed call setup, one has two options as regards H.245 signaling. One can either have the end-points handle this directly, or alternatively require that the gatekeeper mediate between end-points for this too. The H.323 gatekeeper implements a Q.931 FSM for use in gatekeeper routed call setup and related signaling. This finite state machine when viewed from the gatekeeper perspective is depicted in FIG. 6 which shows typical call setup and tear-down. (R) indicates RAS messages. All others are H.225.0 call signaling messages. Only the most important messages are depicted.

Functions of various states within this state machine are as listed below in Table 2.

H.323 gatekeeper states and functions.

| H.323 Gatekeeper State Name | Functional Description |
| --- | --- |
| null state | No call exists. |
| call initiated | The gatekeeper has received a SETUP message from the originating end-point, but has not responded. |
| outgoing call proceeding | The gatekeeper has received all information needed to proceed with call establishment and sends the CALL PROCEEDING message to the originating end-point. |
| call present | The gatekeeper has sent the SETUP message to the terminating end-point to request call termination, but has not received a response. |
| call received | The gatekeeper has received the ALERTING message from the terminating end-point. |
| connect request | The terminating end-point has answered the call, but the gatekeeper has not yet granted the connection. |
| incoming call proceeding | The gatekeeper has received the CALL PROCEEDING message from the terminating end-point indicating that all necessary information has been received to proceed with call establishment. |
| active | The gatekeeper has granted call connection. |
| disconnect request | The gatekeeper has received a DISCONNECT message from an end-point. |
| disconnect indication | The gatekeeper has sent a RELEASE COMPLETE message to disconnect the call. |
| release request | The gatekeeper has sent the RELEASE message to an end-point to release the connection and has not yet received a response. |
| call abort | This state is for point to multi-point calls. This state indicates that the originating end-point has disconnected before call establishment has been completed. |

Figure 7:
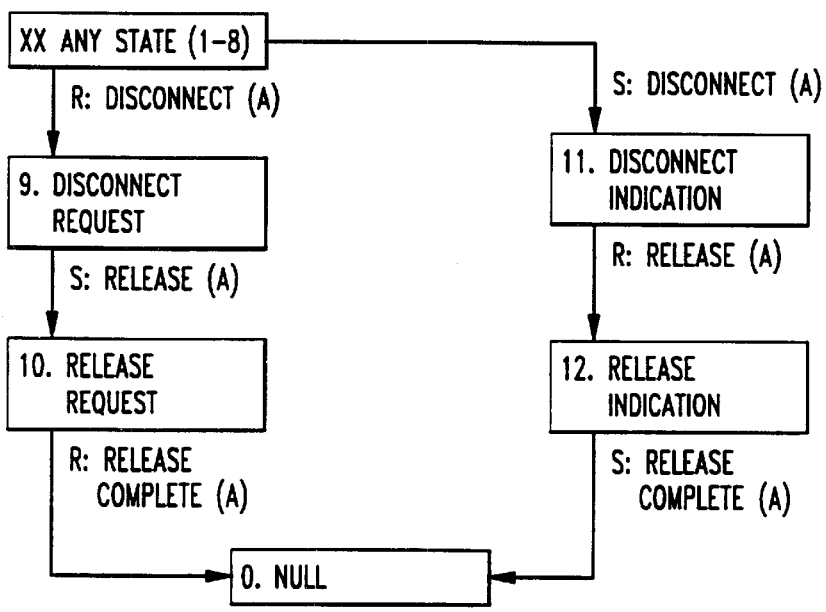
FIG. 7 is a simplified flowchart illustrating Q.931 call tear-down procedures as used in the present invention.

Calls may be torn down as shown in FIG. 7 (from any state in the above diagram). For simplicity in representation, this procedure is depicted from the end-point perspective (end-point B).

Access to IN services from H.323 end-points are facilitated by having the gatekeeper implement an IN call-model layer in accordance with the present invention. The IN call model layer serves as the interface between the H.323 domain as viewed by the gatekeeper and IN services on the SCP. This call model layer detects the points in a call where IN services may be required, implements suitable interfaces to IN components such as the SCP, and transmits appropriately formatted requests for the services to those components. This layer also processes responses received from the IN components and notifies the gatekeeper when appropriate, so that call processing in the H.323 domain may be suitably influenced by information obtained from the IN domain.

In accordance with the present invention, integrating the IN call model into the base platform (here, H.323 gatekeeper) involves mapping the IN call model FSM into the gatekeeper FSM. This provides a tightly coupled pair of state machines that operate in lockstep so that a transition in one state machine is accompanied by a corresponding transition in the other. This also results in a common unified view of a call state across the two domains involved (IP and IN).

Every gatekeeper involved in the process of call-setup that may need to access IN services implements the IN triggers in some form (such an, for instance, the call model layer). Every gatekeeper that supports this implementation runs both the O_BCSM and the T_BCSM FSMs and operates in synchrony with instances of these FSMs on other gatekeepers that are involved in the handling of the same call.

Shown in Table 3 is one embodiment of mapping of the IN call model states into states in the H.323 gatekeeper FSM. In accordance with the present invention. This mapping is generated when one considers the semantic equivalence of functions of states in these two finite state machines. In Table 3, the state numbers in parentheses indicate states from the Q.931 call model from FIGS. 6 and 7.

TABLE 3

| Gatekeeper FSM | IN Call Model |
|---|---|
| null state | O_Null |
|  | T_Null |
| call initiated | Auth_orig_Att |
|  | Collect_Info |
| outgoing call proceeding | Analyze_Info |
|  | Select_Route |
|  | Auth_Call_Setup |
| call present | Call_Sent |
| call received | O_Alerting |
|  | T_Alerting |
| connect request | Present_Call |
| incoming call proceeding | Auth_Term_Att |
|  | Select_Facility |
| active | O_Active |
|  | T_Active |
| disconnect request | O_Exception |
| (states 1–7) | T_Exception |
| disconnect request | O_Disconnect |
| (state 8 ) | T_Disconnect |
| disconnect indication | O_Exception |
| (states 1–7) | T_Exception |
| disconnect indication | O_Disconnect |
| (state 8) | T_Disconnect |
| release request | O_Exception or |
| and release indication | O_Disconnect |
|  | T_Exception or |
|  | T_Disconnect |
| call abort | N/A |

It should be noted here that not all states map very cleanly. However, since it is necessary that all states from one state machine map into the other, for the process of call model integration to be considered complete, some amount of mis-match in this functional mapping needs to be tolerated. (One can cite examples where an exact semantic match cannot be found. For instance, Select_Facility that is concerned with the selection of a physical resource at the terminating end has no direct IP analog). A system constructed in this manner would resemble the one depicted in FIG. 5.

If an end-user subscribes to the Access to the Calling Name (CNAME) IN service, the user receives a caller-ID indication with the calling-user name information on each incoming call on a device hooked up to the user's end-point. Since this feature applies to the receiving or terminating end-point, it is an example of a terminating line feature. The manner in which the present invention provides access to the feature from IP end-points is described below.

As the gatekeeper processes the call setup request and executes the H.323 call model, state transitions there cause analogous transitions to be made in the IN call model FSM in the integrated IN call model layer. When the IN call model transitions to the appropriate PIC, the appropriate service request is made.

The CNAME service can be accessed by arming the Terminating-Attempt trigger (in DP 22) in the T_BCSM of the IN call model. When this trigger fires, a TCAP request is formatted by the IN call model layer hosted on the gatekeeper and transmitted to the SCP with (among other things) the calling party number. The SCP responds with CNAME information encoded within the response TCAP payload. This calling-name information is extracted by the IN call model layer, and made available to the gatekeeper. The gatekeeper can then pass this on to the device connected to the line at the terminating end using a SETUP message or otherwise.

It is important to note that while the mappings specified in this paper are based on the H.323 specification, different implementations of that specification (that are all certified H.323 compliant), might implement/support the gatekeeper state machines at different levels of granularity, thus resulting in call model mappings that are different, some of which may be more accurate than others.

Figure 8:
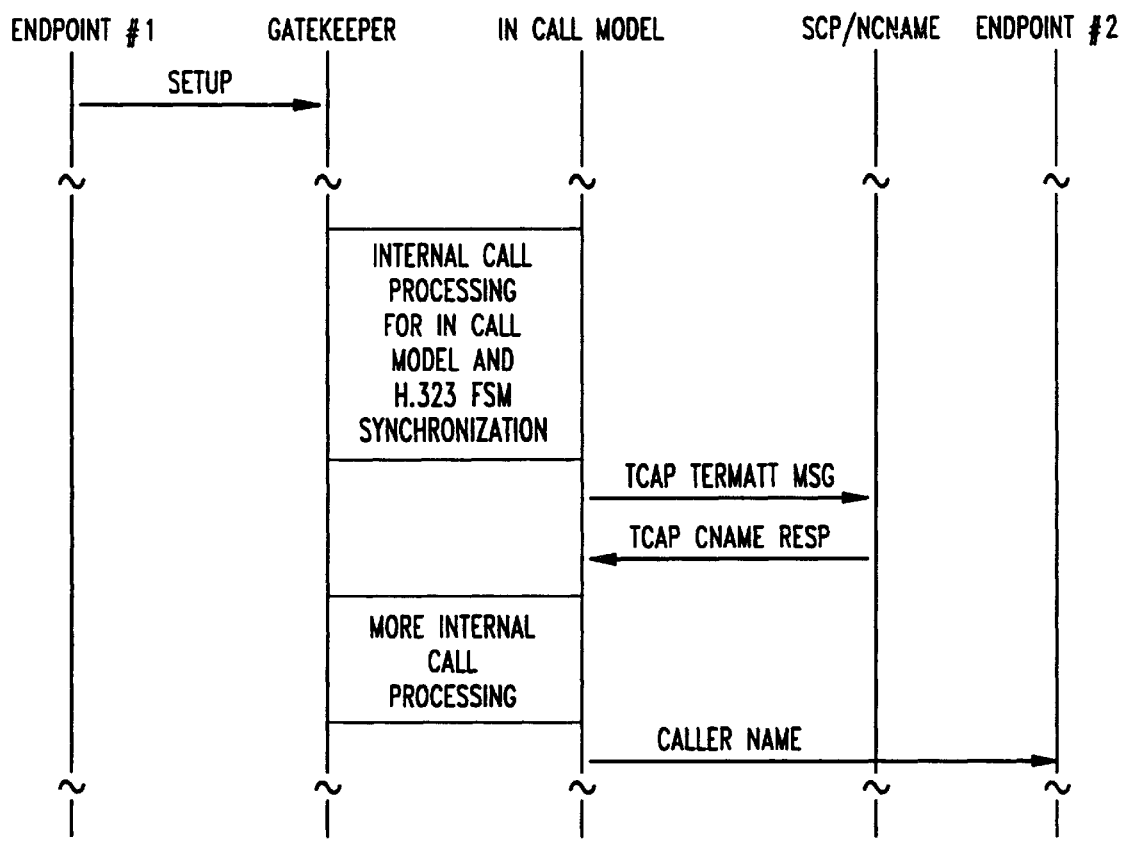
FIG. 8 is a call flow chart depicting access to the calling name (CNAME) Intelligent Network (IN) service in accordance with one aspect of the present invention.
Figure 9:
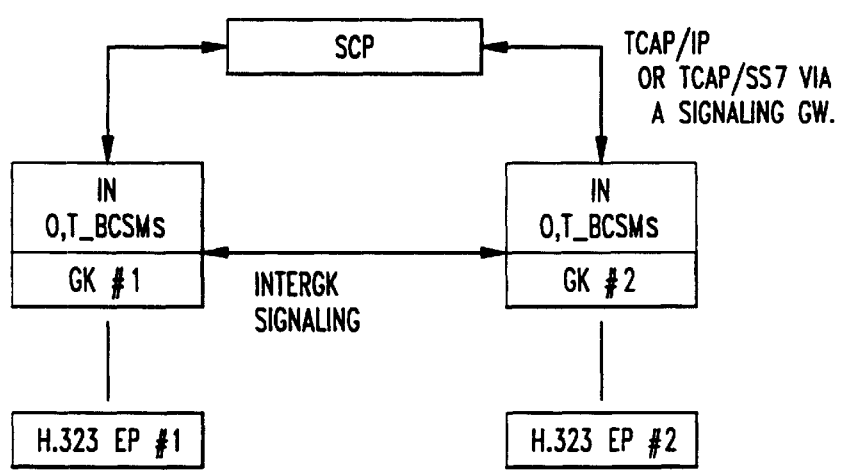
FIG. 9 is a simplified block diagram of an Internet telephony system wherein intelligent network access is provided involving multiple gatekeepers in accordance with another aspect of the present invention.
Figure 10:
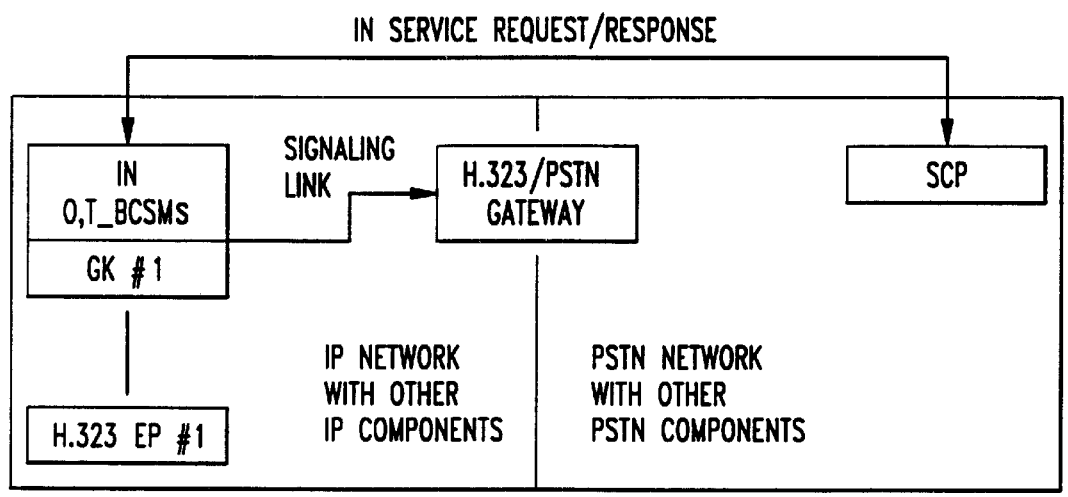
FIG. 10 is a simplified block diagram of an Internet telephony system in which intelligent network access is provided via cross-domain calls between the H.323 and public switched telephone network (PSTN) domains in accordance with another aspect of the present invention.

The call flow shown in FIG. 8 depicts access to the CNAME service and processing of the CNAME query when both the H.323 end-points in question lie within the same gatekeeper zone. Call flows are more complicated when end-points lie within different zones, or if the calling or called party lies within a totally different type of network (call path is set up through a gateway). In both cases, some form of signaling between gatekeepers, (or between a gatekeeper and some other entity in the other network, co-ordinated via a signaling gateway) is needed to keep the FSMs on each synchronized with that in the other. This is shown in the simplified block diagram of FIG. 9. More than 2 GKs may be involved in the setup of two party calls if, for instance, access to an IN feature is required that neither of the end GKs can satisfy, and there exists a GK in that H.323 network, that can process that request. In addition, cross-domain calls may be made with H.323 as shown in FIG. 10 which illustrates the case for a call between the H.323 and PSTN domains. As in FIG. 8, the IN call model may access the SCP using either TCAP/IP (if the SCP supports such interfaces), or via a signaling gateway. Bearer connections are not shown for simplicity.

The following is a detailed description of a specific implementation of the present invention based upon the following major components:

a. an elemedia® gatekeeper (version 1.2, GK) that serves as a mediator between end-points during the process of "Gatekeeper Routed Call Setup," and which hosts the IN call model layer implementation, (elemedia® is a registered trademark of Lucent Technologies); and b. An IN call model layer that serves as the physical embodiment of the IN Call Control Function (CCF) and Service Switching Function (SSF) from the distributed functional plane of the IN layered architecture. Details of the CCF and SSF can be found in "*The Intelligent Network standards: Their Application to Services,*" referenced above. This combination of components is often referred to as a soft SSP. These components share a unified view of a call state that is based on the contents of a shared data-structure.

The elemedia® gatekeeper is primarily concerned with end-point interfaces and events received therefrom, while the IN call model layer is more focused on IN interactions and service-level operation. However, both components possess the capability to influence a call-state by populating the shared data-structure with knowledge gained from their respective domains, and are influenced by what happens in the other domain. In addition, the finite state machines or FSMs associated with the elemedia® gatekeeper and the IN call model layer are tightly coupled as a result of call model integration, and they therefore operate in lock-step (a transition made in one FSM is reflected by a corresponding transition being made in the other).

The operation of the embodiment of the invention described in the following paragraphs may be summarized by the following sequence of steps:

a. a call originates from a NetMeeting end-point, with signaling messages being directed towards the gatekeeper ("gatekeeper routed call signaling"). NetMeeting is configured to use what resembles a traditional PSTN numbering plan with each NetMeeting terminal being assigned a "phone" number;

b. the gatekeeper creates an instance of an IN call model object, populates the shared data-structure with information elements derived from this message, and continues with normal processing;

c. as the gatekeeper transitions through various states in its FSM, analogous state transitions are made in the FSM of the IN call model. The IN call model may query a local policy server to determine what services the calling and called parties have subscribed to, at appropriate points in the call:, d. at certain points in the call model, based on what triggers are turned on, the IN call model may, if a particular trigger fires, generate the appropriate properly-formatted TCAP message, forward it to the SCP, and then receive the response to the query from said SCP;

e. the IN call model then decodes the response, populates the shared data-structure with information so obtained, and lets the gatekeeper proceed with its call processing functions; and f. the gatekeeper uses data from this shared data-structure at each transition point to determine what to do next.

Thus, all call processing (including if and when a call should be disconnected or torn-down) can be controlled by both the gatekeeper and the IN call model layer. Access mechanisms (triggers and message formats) to several IN features are described to demonstrate IN services in the IP context. These include Call Forwarding, Originating Call Screening for 900 numbers, 800 number routing, etc. H.323 is a set of signaling protocols that define real-time multimedia communications and conferencing over packet-based networks. These standards define how components are built in compliance with the H.323 protocol to set up calls, exchange compressed audio and video, and participate in multi-unit conferences. Each signaling protocol serves a different purpose:

1. RAS signaling is used for signaling between end-points and the gatekeeper for functions such as authentication, authorization and bandwidth management. RAS signaling is done before other call-related signaling.

Figure 11:
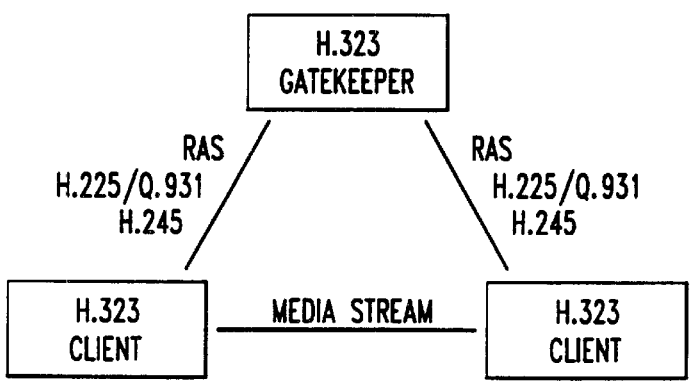
FIG. 11 is a simplified block diagram showing the routing of call signaling by a gatekeeper to two connected end-points in a telephony system in which the present invention is intended for use.

2. The H.225/Q.931 signaling is used for call setup and control to establish a connection between two H.323 end-points. Call signaling may occur directly between two end-points or may occur with the gatekeeper in the signaling path from one end-point to the other. The latter is termed "Gatekeeper Routed Call Signaling" and is shown in simplified block diagram form in FIG. 11.

3. H.245: supports call control functions for multimedia communications including determining end-point capabilities and opening and closing of media channels.

In its simplest form, the elemedia® gatekeeper FSM consists of eight states and is driven by a H.323 Q.931-based message set. The elemedia® FSM call states include CallIdle, IncomingCallPresented, OutgoingCallPresented, IncomingCallAlerting, OutgoingCallAlerting, CallSignallingActive, CallError, and CallDisconnected. The elemedia® message set consists of Setup, Call Proceeding, Alerting, Connect, Status, and Release Complete(REL_COMP). End-points may be registered with the gatekeeper through the use of RAS messages. The gatekeeper maintains a mapping of end-point IP addresses and E.164 (phone) numbers. The traditional PSTN numbering plan is thus supported for call set-up through NetMeeting®. NetMeeting® is a registered trademark of Microsoft.

Figure 12:
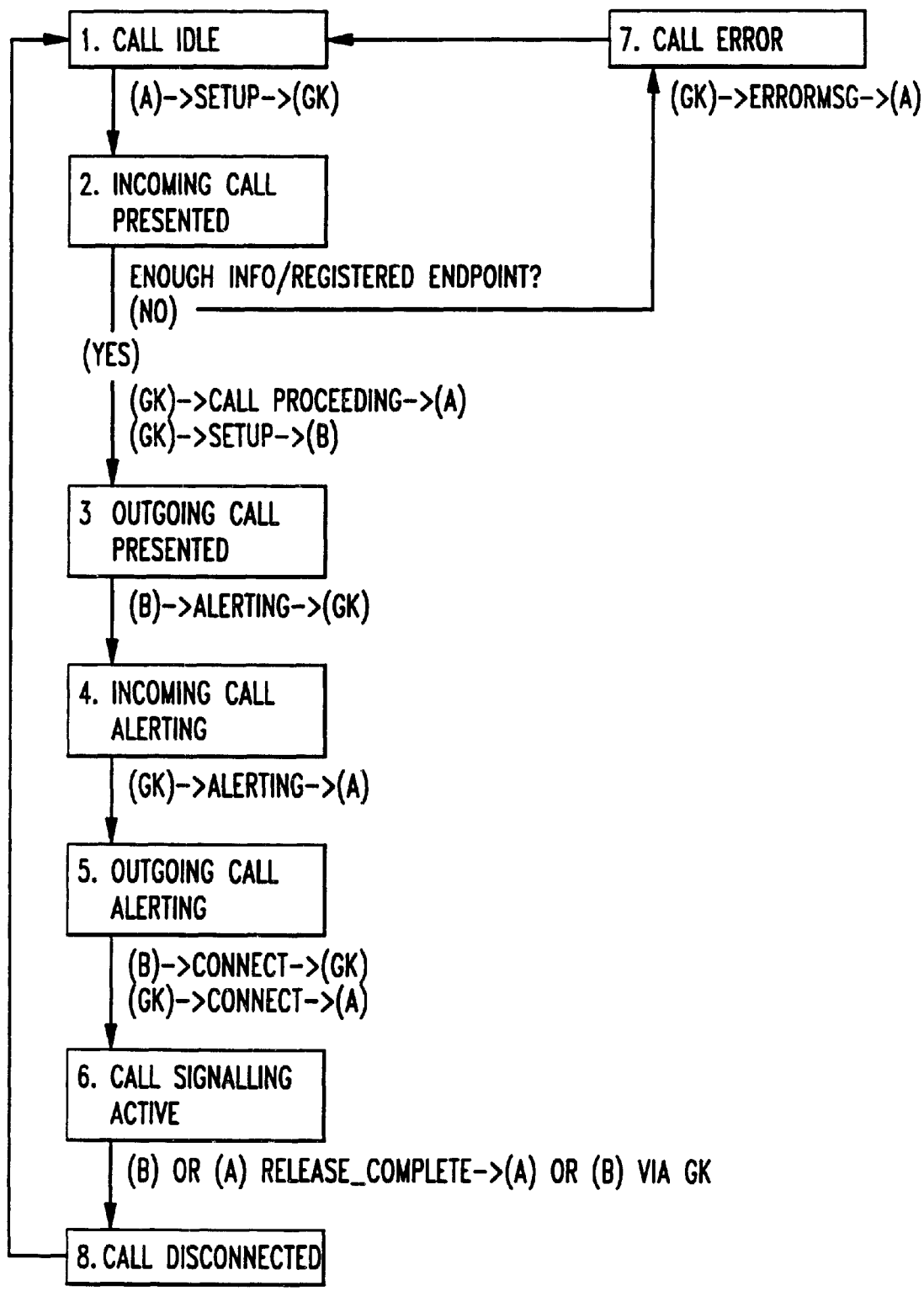
FIG. 12 is a simplified flowchart illustrating the basic flow of messages involving two end-points A and B registered to the same gatekeeper (GK)

FIG. 12 shows in simplified schematic diagram form a basic message flow involving two end-points (A and B) registered to the same gatekeeper (GK). The GK starts out in the CallIdle state, that is, no call exists. Other calls may exist in the general gatekeeper context, but there is no information associated with this particular call. A sends the Setup message to the GK requesting that a call to B be initiated. The GK first checks to make sure that both A and B are registered with it and that the information contained in the Setup message is correct and sufficient. If either condition fails, the GK sends an error message to A and call processing halts. Otherwise, the GK locates B and forwards the Setup message to it, while sending a Call Proceeding message to A. When the call is presented at the terminating end-device, and the user at that end is alerted, B sends an Alerting message to the GK which passes on this message to A. Upon acceptance of the call at the terminating end, B sends a Connect message to the GK which again forward this to A. Capability negotiation and other related signaling now takes place between the two end-points, and a communication path is set up between them. When either A or B want to end the call, Release Complete messages are exchanged between the two end-points via the gatekeeper, and the call is torn down.

The IN call model layer is based on the CS-independent generic Basic Call State Model (BCSM) defined in the aforementioned reference. This call model defines 18 states or PICs (Point in Call) and 35 Detection Points (DPs). Each PIC defines a point in a call where some call logic may be executed in the context of the current call being processed. DPs are located in the transitions between PICs and are the points in call processing which identify when IN service access is available. If a DP contains an armed trigger and certain criteria associated with the trigger are met, then a query to an SCP or other IN network component for an IN service may be launched. This BCSM was chosen as the IN call model to ensure that any IN features could be serviced. The IN call model is called a half call model because it consists of two FSMs, one modeling the state in call of the originating or calling end-point and one modeling the state in call of the terminating or called end-point.

The originating end-point FSM is termed the Originating Basic Call State Model (O_BCSM) and is shown in previously described FIGS. 3a and 3b. The FSM associated with the terminating end-point is called the Terminating Basic Call State Model (T_BCSM) and is shown in previously described FIG. 4. The IN call model layer implements both of these BCSMs.

The gatekeeper FSM does not support the PICs and DPs necessary to identify and access IN services. In accordance with the present invention, the gatekeeper is provided with an IN call model layer. The IN call model layer serves as the interface between the H.323 domain and the IN network. This call model layer detects the points in a call where IN services may be required, implements the interfaces to IN components supporting these services, and transmits encoded requests to the IN service components. This layer also processes responses received from the IN components and passes the information back to the gatekeeper for use in subsequent call processing.

Shown in Table 4 is a mapping of the IN call model states into states in the gatekeeper FSM that considers the semantic equivalence of functions of states in these two finite state machines in accordance with one embodiment of the present invention.

TABLE 4

| O_BCSM Call State | elemedia FSM State | T_BCSM Call State |
|---|---|---|
| O_NULL | Call Idle | T_NULL |
| | Incoming Call Presented | Auth_Term_Attempt |
| | | Select_Facility |
| | | Present_Call |
| Auth_Orig_Attempt | Outgoing Call Presented | |
| Collect_Info | | |
| Analyze_Info | | |
| Select_Route | | |
| Auth_Call_Setup | | |
| Call_Sent | | |
| O_Alerting | Incoming Call Alerting | |
| | Outgoing Call Alerting | T_Alerting |
| O_Active | Signaling Active | T_Active |
| O_Disconnect | Call Disconnected | T_Disconnected |
| O_Exception | Call Error | T_Exception |

Synchronizing the IN call model and the gatekeeper FSM is accomplished through the implementation of a shared data structure shown in Table 5. This data structure is updated and read by both the IN call model and the gatekeeper and helps maintain state machine synchrony while simultaneously permitting each access to services in their respective domains, and the capability to influence call processing appropriately.

TABLE 5

```
typedef struct call_info{
    char    CRV[MAX_CRV];           // Transaction ID
    char    CdPN[MAX_NUM];          // Called Party Number
    char    CgPN[MAX_NUM];          // Calling Party Number
    int     Current_State;          // For IN Call Model
    int     Suggested_Next_State;   // For IN Call Model
    unsigned long DP_OBCSM;         // Detection point for O_BCSM
    unsigned long DP_TBCSM;         // Detection point for _TBCSM
    int     O_Event;                // DP for OBCSM
    int     T_Event;                // DP for TBCSM
    long    start_time;             // for billing
    long    stop_time;              // for billing};
```

An SCP simulator was programmed to receive requests from IP end-points encoded in the TCAP/IP format. All requests received are processed appropriately and a TCAP/IP response generated. This response is routed back to the client (soft SSP) that originated the request. Reuse of existing service logic on the SCP requires a careful encoding of service requests at the SSP end to conform to established guidelines so that the SCP may process the requests it receives, and generate the appropriate responses.

A couple of simple call flows are discussed in the following paragraphs for the purpose of describing the operation of the present invention. For ease of explanation, only call setup is discussed. From the preceding discussion, it should be clear how call tear-down may be handled. In the following discussion, it is assumed, that user A, the call originator, has subscribed to the 900-OCS service and that user B, the called party, has subscribed to the CNAME service. A and B use NetMeeting to initiate and accept calls.

The 900-OCS service works by blocking calls with a 900 prefix from being made from end-points connected to lines that have this service activated. Since this feature applies to call origination, it is an originating line feature. This feature is accessed by the SSP as required (depending on whether the trigger for this feature is turned on or not), from PIC 3, DP 5 of the C_BCSM. If an end-user subscribes to the CNAME service, the user receives a caller-ID indication with the calling-user name information on each incoming call on a device hooked up to the user's end-point. Since this feature applies to the receiving or terminating end-point, it is an example of a terminating line feature. The CNAME service can be accessed by arming the Terminating Attempt trigger (in DP 22) in the T_BCSM of the IN call model.

When user A originates a simple call to user B (not a number with a 900 prefix), through MetMeeting, B is presented with the call, and may choose to accept it. From the user perspective, all the steps listed above under the description of operational steps, are carried out in sequence. All state transitions made by the gatekeeper are also reflected by analogous transitions within the IN call model.

Figure 13:
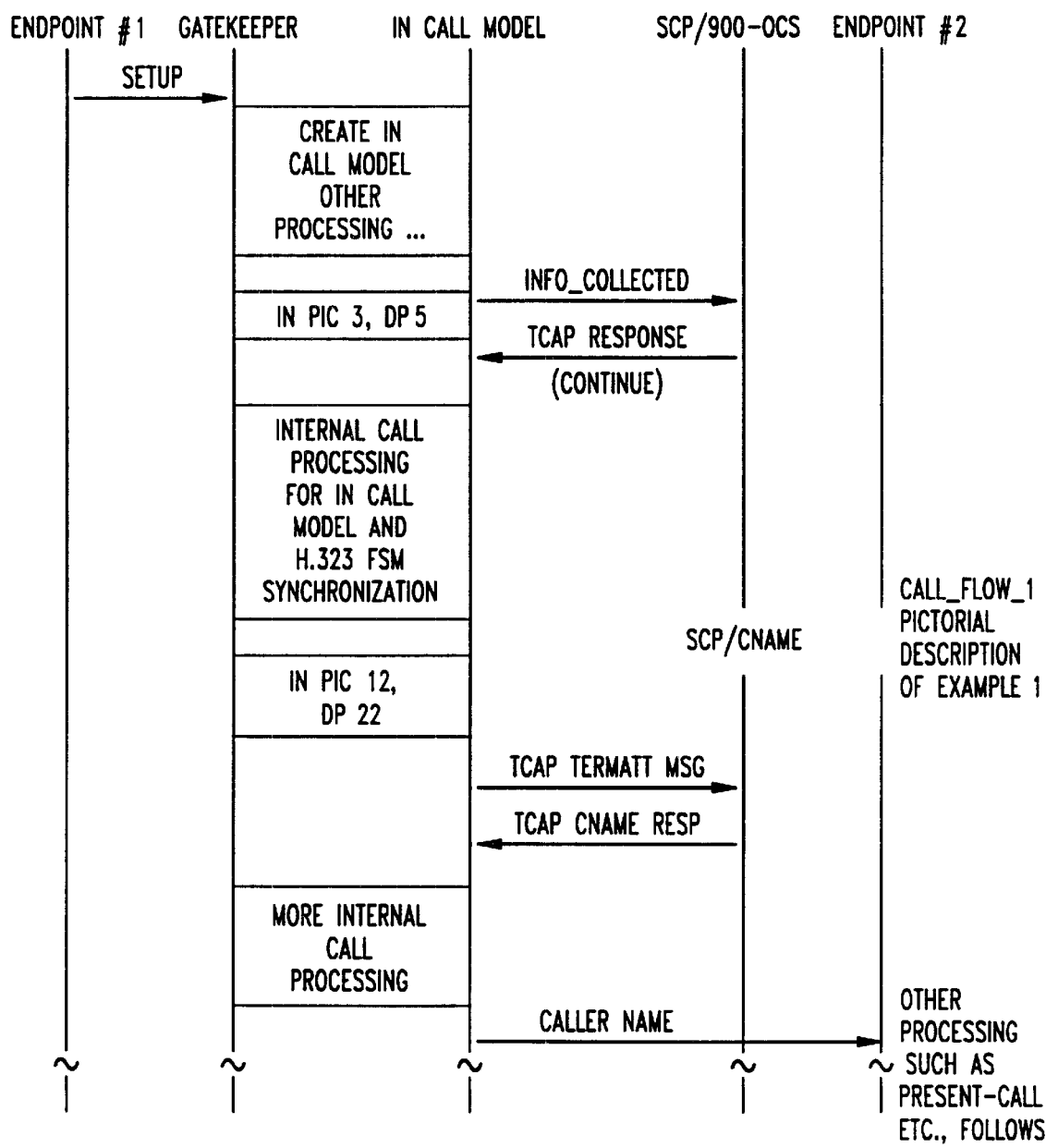
FIG. 13 is a simplified schematic diagram of call flow in providing Access to the Calling Name (CNAME) IN service in an IP-based network.

When the IN call model makes a transition to PIC 3, in DP 5 an Info_Collected TCAP message is formatted (using data from the shared data-structure for that call) and sent to the SCP for processing. Since this is not a 900-number call attempt, the SCP returns an appropriately-formatted TCAP response that indicates that this call may be permitted. The IN call model then decodes the TCAP response, populates the shared data-structure appropriately, and notifies the gatekeeper to continue with call processing, which it does. Thus, the two FSMs operate in lock-step. Again, when the IN call model transitions through DP 22, a CNAME query is made to the SCP, which responds with the user name registered with the line associated with the calling party, in a suitably formatted TCAP response. This information is then forwarded to the call monitor. (NetMeeting already provides the CNAME feature in the IP domain using information in the user profile tied into the NetMeeting application, so the CNAME information from the SCP is forwarded to the call monitor, which displays it on its GUI. This is schematically depicted in FIG. 13, wherein CNAME information is shown as being forwarded to the terminating end-point, for clarity.

Figure 14:
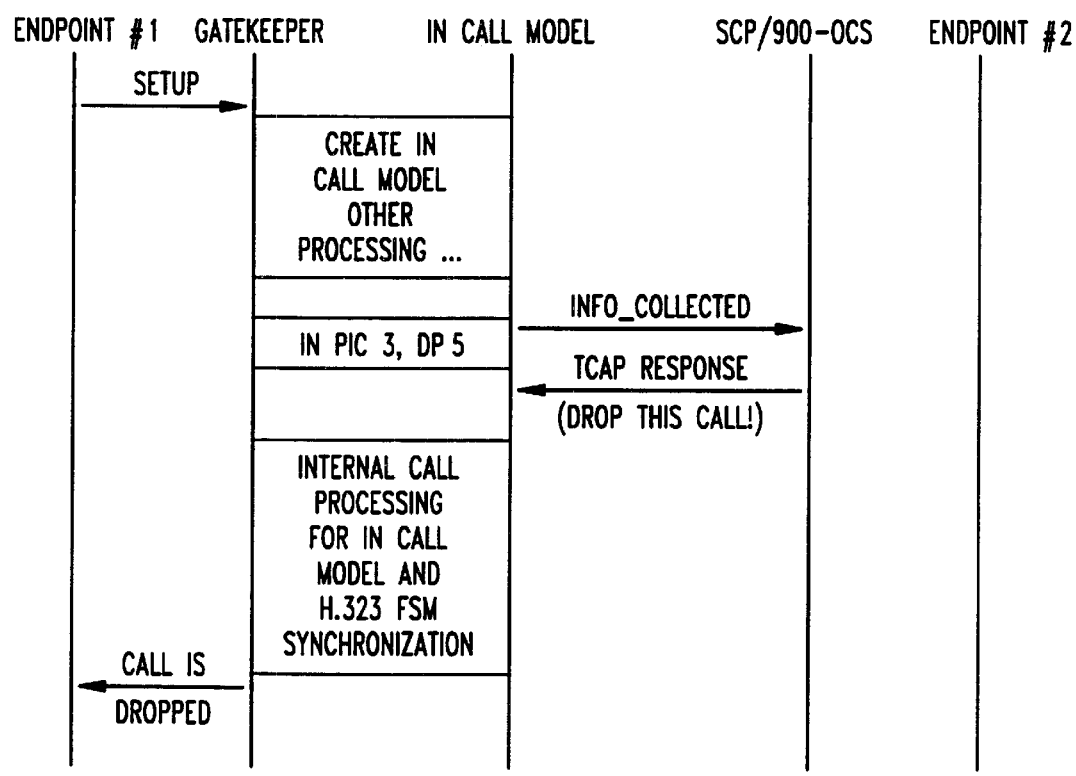
FIG. 14 is a simplified diagram showing the call flow for 900-call screening service in an IP-based network.

As a second example, let us look at what happens when A originates a 900-call. The usual operational steps are followed. When the OCS query is made however the SCP returns a response indicating that the call may not be permitted to go through. The IN call model then populates the shared data-structure with this information and notifies the gatekeeper to carry on with call processing. The gatekeeper reads this shared data-structure and drops the call. This scenario is depicted in FIG. 14. From a user perspective, A originates the call, and the call is dropped, and a message is played to indicate that "the call could not be completed as dialed."

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. For use in an Internet Protocol voice over communications network including a plurality of subscribers connected by means of a soft service switching point, a system for providing Intelligent Network services to said subscribers, said system comprising:

a service control point disposed in an Intelligent Network and connected to a soft service switching point;

a base platform state machine in the soft service switching point for controlling communications between the subscribers, wherein said base platform state machine includes a first plurality of defined states of the subscribers and wherein first transitions between said first defined states control communications between the subscribers; and a call model state machine in the soft service switching point for controlling communications with said service control point, wherein said call model state machine is further coupled to said base platform state machine and includes a second plurality of defined states of said soft service switching point with second transitions between said second defined states controlling access to the Intelligent Network services, wherein each of said first defined control states in said base platform state machine has a corresponding second defined control state in said call model state machine for allowing said base platform and call model state machines to operate synchronously.

2. The system of claim 1 wherein the subscribers include a call originating subscriber and a call terminating subscriber, and wherein said second plurality of defined states include an Originating Basic Call State Model and a Terminating Basic Call State Model.

3. The system of claim 1 further comprising a data structure shared by said base platform state machine and said call model state machine for synchronizing the operation of said state machine.

4. The system of claim 1 wherein each of said first transitions has a corresponding second transition, and wherein each set of corresponding transitions represents corresponding functions in said base platform state machine and said call model state machine.

5. The system of claim 1 wherein each of said first transitions comprises a point in call for exercising control over a call and each of said second transitions includes a detection point for identifying when an IN service is available.

6. A method for providing services from an Intelligent Network to subscribe of an Internet Protocol voice over communications network, said method comprising the steps of:

connecting the subscribers by means of a soft service switching point having a base platform state machine, wherein said base platform state machine includes a first plurality of defined states of the subscribers;

controlling communication among the subscribers by means of first transitions between said first defined states;

connecting said soft service switching point to the Intelligent Network by means of a call model state machine having a second plurality of defined states, wherein said call model state machine is further coupled to said base platform machine;

controlling access of the subscribers of the Internet Protocol voice over communications network to the Intelligent Network by means of said call model state machine; and synchronizing operation of said base platform state machine and said call model state machine by mapping each of said first defined states in said base platform state machine into a corresponding second defined state in said call model state machine, whereby said base platform state machine and said call model state machine synchronously undergo corresponding transitions between defined states during a call.

7. The method of claim 6 wherein the step of mapping each of said first defined states in said base platform state machine into a corresponding second defined state in said call model state machine includes providing a shared data structure between said base platform state machine and said call model state machine.

8. The method of claim 6 further comprising the steps of providing a half call model in said call model state machine and synchronizing said half call model with said base platform state machine.

9. The method of claim 6 further comprising the step of determining the Intelligent Network services which each of said subscribers is entitled to receive.

10. For use in an Internet Protocol voice over communications network including a plurality of subscribers, a system for providing Intelligent Network services to said subscribers, said system comprising:

a service control point disposed in an Intelligent Network;

a first soft service switching point connecting a first subscriber to said service control point;

a second soft service switching point connecting a second subscriber to to said service control point, wherein said second soft service switching point is further coupled to said first soft service switching point;

first and second base platform state machines respectively in said first and second soft service switching points for controlling communications between subscribers, wherein each of said first and second base platform state machines includes a first plurality of defined states of the subscribers and wherein first transitions between said first defined states control communications between the subscribers; and first and second call model state machines respectively in the said first and second soft service switching points for controlling communications between said service control point and said first and second soft service switching points, respectively, wherein said first and second call model state machines are further coupled to said first and second base platform state machines, respectively, wherein each of said first and second call model state machines includes a second plurality of defined states of said soft service switching points with second transitions between said second defined states controlling access of said first and second subscribers to the Intelligent Network services, wherein each of said first defined control states in said base platform state machines has a corresponding second defined control state in said call model state machines for allowing said base platform and call model state machines to operate synchronously.

* * * * *